United States Patent
Kim

(10) Patent No.: US 11,858,546 B2
(45) Date of Patent: Jan. 2, 2024

(54) APPARATUS AND METHOD FOR ADJUSTING STEERING WHEEL

(71) Applicant: HYUNDAI MOBIS CO., LTD., Seoul (KR)

(72) Inventor: Seo Young Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/970,939

(22) Filed: Oct. 21, 2022

(65) Prior Publication Data

US 2023/0166786 A1 Jun. 1, 2023

(30) Foreign Application Priority Data

Nov. 29, 2021 (KR) .................. 10-2021-0166916

(51) Int. Cl.
*B62D 1/181* (2006.01)
*G06V 20/59* (2022.01)

(52) U.S. Cl.
CPC .......... *B62D 1/181* (2013.01); *G06V 20/597* (2022.01)

(58) Field of Classification Search
CPC ....... B62D 1/181; B62D 1/183; G06V 20/597
See application file for complete search history.

(56) References Cited

U.S. PATENT DOCUMENTS

| | | | | |
|---|---|---|---|---|
| 2010/0002075 A1* | 1/2010 | Jung | ............. | B60K 28/06 348/78 |
| 2012/0002028 A1* | 1/2012 | Takahashi | ............. | B60K 37/04 348/78 |

FOREIGN PATENT DOCUMENTS

| | | | | |
|---|---|---|---|---|
| CN | 104724157 A | * | 6/2015 | |
| CN | 109383525 A | * | 2/2019 | ............ B60W 50/14 |
| CN | 110775140 A | * | 2/2020 | |
| CN | 111107309 A | * | 5/2020 | ......... G06K 9/00845 |
| DE | 102016002289 A1 | * | 8/2016 | |
| EP | 3453589 A1 | * | 3/2019 | ............ B60K 35/00 |
| GB | 2558653 A | * | 7/2018 | ............ B62D 1/105 |
| KR | 10-0921092 B1 | | 10/2009 | |

* cited by examiner

*Primary Examiner* — Drew J Brown
(74) *Attorney, Agent, or Firm* — Novo TechIP International PLLC

(57) ABSTRACT

The present disclosure relates to an apparatus for adjusting a steering wheel, which include: a camera unit installed inside a vehicle to photograph a driver's face; and a control unit which processes an image photographed by the camera unit to detect a face shape, checks whether higher and lower portions of detected face are photographed in an optimal face shape without being cut off, and outputs designated steering wheel adjustment information when the face shape is not the optimal face shape.

10 Claims, 5 Drawing Sheets

APPARATUS AND METHOD FOR ADJUSTING STEERING WHEEL

CROSS-REFERENCE TO RELATED APPLICATIONS

This application claims the benefit of priority to Korean Patent Application No. 10-2021-0166916, filed on Nov. 29, 2021, of which the disclosure is incorporated herein by reference in its entirety.

TECHNICAL FIELD

Exemplary embodiments of the present disclosure relate to an apparatus and a method for adjusting a steering wheel, and more particularly, to an apparatus and a method for adjusting a steering wheel by which the steering wheel is adjusted so that a driver's face is optimally photographed when the driver's face is monitored through a camera disposed at a vehicle (including In-Cabin Camera).

BACKGROUND

In general, a camera (including In-Cabin Camera or ICC camera) in a driver monitoring system is one of the key components of an autonomous vehicle, which is mounted inside a vehicle to check a state of a rider in real time.

Meanwhile, the driver monitoring system photographs a driver's face using an infrared camera and infrared light, processes a photographed driver's face image, analyzes closed eyes, a face angle, and the like, and detects careless driving such as sleepiness and negligence of forward gaze.

In this case, a camera of the driver monitoring system is generally mounted on a cluster of a vehicle, an upper end of a C-Pad, or an upper end of the cover of a steering column.

However, when the camera is mounted on the upper end of the cover of the steering wheel column, a problem in optimally photographing the driver's face depending on a height of the steering wheel can occur. For example, depending on an angle of the steering wheel, a forehead or chin of the face can be cut off.

When the driver's face is not optimally photographed (that is, "optimally" means that an entire face is photographed without the forehead or chin being cut off from the driver's face), since state information of the driver (for example: yawning, conversation recognition, or the like) is difficult to determine, a function of adjusting the steering wheel upward and downward (vertically) needs for optimally photographing an entire face of the driver.

The related art of the present disclosure is disclosed in Korean Patent Application No. 10-0921092 (published on Oct. 1, 2009 and entitled "Driver state monitoring system using a camera mounted on a steering wheel").

SUMMARY

According to one aspect of the present disclosure, the present disclosure has been created to solve the above problems, various embodiments are directed to an apparatus and a method for adjusting a steering wheel, which is capable of adjusting a steering wheel so that a driver's face is optimally photographed when the driver's face is monitored through a camera installed inside a vehicle (including In-Cabin Camera).

In an embodiment, an apparatus for adjusting a steering wheel according to one aspect of the present disclosure include: a camera unit installed inside the vehicle to photograph the driver's face; and a control unit which processes an image photographed by the camera unit to detect a face shape, checks whether upper and lower portions of the detected face are photographed in an optimal shape without being cut off, and outputs designated steering wheel adjustment information when the face shape is not the optimal face shape.

The control unit may check the face shape in which eyes, nose, mouth, forehead, and chin forming a face shape are all photographed within a screen without being covered or cut off as the optimal face shape.

The camera unit may be installed at a center of an upper end of a cover of a steering column inside the vehicle.

The control unit may further include a steering wheel adjustment information output unit by converting steering wheel adjustment information output based on a result of checking whether the user's face is photographed in the optimal face shape into an appropriate signal form and then outputs the appropriate signal form to a designated output target apparatus. The output target apparatus may include at least one of a steering wheel driving unit that automatically adjusts a height of the steering wheel using an electric motor and an information output unit that outputs audio, video, and navigation information.

The control unit may output steering wheel adjustment information for lifting the steering wheel when a forehead portion of the face is cut off or covered and then photographed as a result of checking whether the user's face is photographed in the optimal face shape.

The control unit may output steering wheel adjustment information for lowering the steering wheel when a chin portion of the face is cut off or covered and then photographed as a result of checking whether the user's face is photographed in the optimal face shape.

A method of adjusting a steering wheel according to another aspect of the present disclosure include: photographing, by a control unit, a driver's face through a camera unit; detecting, by the control unit, a face shape by processing an image photographed by the camera unit; checking, by the control unit, whether upper and lower portions of the detected face are photographed in the optimal shape without being cut off; and outputting, by the control unit, designated steering wheel adjustment information when the face shape is not the optimal face shape according to a check result.

In the checking of whether the face is photographed in the optimal face shape, the control unit may check the face shape in which eyes, nose, mouth, forehead, and chin forming a face shape are all photographed within the screen without being covered or cut off as the optimal face shape.

The camera unit may be installed at a center of an upper end of a cover of a steering column inside the vehicle.

The outputting of the steering wheel adjustment information may further include converting the steering wheel adjustment information output by the control unit into an appropriate signal form and outputting the appropriate signal form to the designated output target apparatus through the steering wheel adjustment information output unit. The output target apparatus includes at least one of the steering wheel driving unit that automatically adjusts the height of the steering wheel using an electric motor and the information output unit that outputs audio, video, and navigation information.

In the checking of whether the user's face is photographed in the optimal face shape, the control unit may output steering wheel adjustment information for lifting the steering wheel when the forehead portion of the face is cut off or covered and then photographed as the result of checking whether the user's face is photographed in the optimal face shape.

In the checking of whether the user's face is photographed in the optimal face shape, the control unit may output steering wheel adjustment information for lowering the steering wheel when the chin portion of the face is cut off or covered and then photographed as a result of checking whether the user's face is photographed in the optimal face shape.

According to one aspect of the present disclosure, when the driver's face is monitored through a camera (including In-Cabin Camera) installed inside the vehicle, the steering wheel can be adjusted, thereby optimally photographing the entire face without cutting off the forehead or chin from the driver's face.

DETAILED DESCRIPTION

Figure 1:
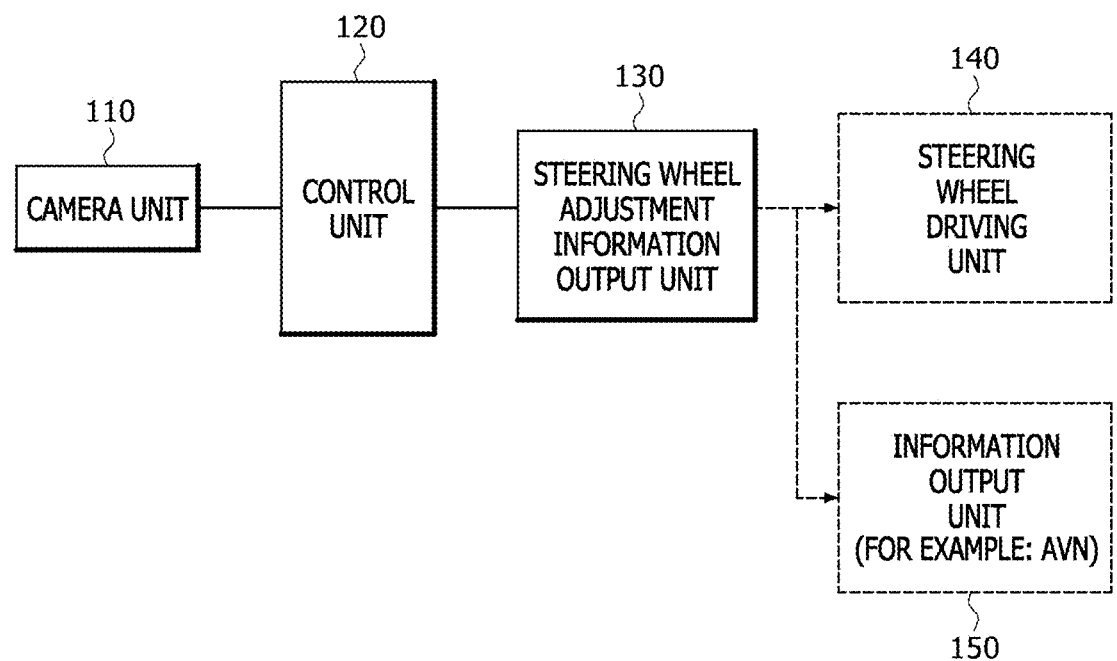
FIG. 1 is an exemplary diagram illustrating a schematic configuration of an apparatus for adjusting a steering wheel according to an embodiment of the present disclosure.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereinafter, an apparatus and a method for adjusting a steering wheel will be described below with reference to the accompanying drawings through various exemplary embodiments.

For clarity and convenience in description, thicknesses of lines, sizes of constituent elements and the like may be illustrated in an exaggerated manner in the drawings. In addition, terms described below are defined by considering functions according to the present disclosure and may vary according to the intention of a user or a manager or according to the common practices in the art. Therefore, definitions of these terms should be defined in light of details disclosed throughout the present specification.

FIG. 1 is an exemplary diagram illustrating a schematic configuration of an apparatus for adjusting a steering wheel according to an embodiment of the present disclosure.

As illustrated in FIG. 1, the apparatus for adjusting a steering wheel according to the present embodiment includes a camera unit 110, a control unit 120, and a steering wheel adjustment information output unit 130.

The camera unit 110 is installed (disposed or mounted) at the center of the upper end of the cover of a steering column inside the vehicle.

The camera unit 110 includes a charge-coupled device (CCD) or complementary metal-oxide semiconductor (CMOS) type digital camera, or an in-cabin camera (including In-Cabin Camera or ICC camera).

The control unit 120 detects a face by processing an image captured by the camera unit 110. That is, the control unit 120 processes the image captured by the camera unit 110 to detect a shape of the face (that is, eyes, nose, mouth, forehead, chin or the like).

For reference, in the present embodiment, since the camera unit 110 is installed (mounted) at the center of the upper end of the cover of the steering column inside the vehicle, the face is not biased to any one of left and right sides of the screen (including a partial deflection error) during capturing or photographing.

In addition, the control unit 120 checks whether predetermined portions (e.g., a forehead and chin) of the face detected in the captured image are in an optimal face shape (that is, for example, eyes, nose, mouth, forehead, and chin forming the face shape are included in the captured image in their entirety without any of the portions being partially or entirely covered or cut off).

In addition, as the result of checking whether a user's face is photographed in the optimal face shape, the control unit 120 outputs information for lifting the steering wheel when a forehead portion of the face is cut off or covered and then photographed.

In addition, as the result of checking whether the user's face is photographed in the optimal face shape, the control unit 120 outputs information for lowering the steering wheel when a chin portion of the face is cut off or covered and then photographed.

That is, in the present embodiment, since the camera unit 110 is fixed to the center of the upper end of the cover of the steering column inside the vehicle, a height of the steering wheel is adjusted to photograph the optimal face shape (that is, eyes, nose, mouth, forehead, and chin forming the face shape are all photographed within the screen without being covered or cut off).

Meanwhile, the control unit 120 outputs a signal (for example: good signal) indicating that the height of the steering wheel is in an appropriate (or optimal) state when the user's face is photographed in the optimal face shape (that is, eyes, nose, mouth, forehead, and chin forming the face shape are all photographed within the screen without being covered or cut off) as the result of checking whether the user's face is photographed in the optimal face shape.

The steering wheel adjustment information output unit 130 converts steering wheel adjustment information (i.e., adjustment information) output based on the result of checking whether the user's face is photographed in the optimal face shape by the control unit 120 into an appropriate signal form (i.e., an adjustment signal instructing or causing the steering wheel to be lifted or lowered) to a designated output target apparatus (for example: a steering wheel driving unit 140 and an information output unit 150) and outputs the converted signal.

Herein, the output target apparatus (for example: the steering wheel driving unit 140 and the information output unit 150) is an apparatus disposed at or installed in a target vehicle and may include at least one of the steering wheel driving units 140 which may automatically adjust the height of the steering wheel by an electric motor or the information output unit 150 which may output audio, video, and navigation information according to a vehicle type. For reference, the information output unit 150 is basically mounted on a recently released vehicle (including an autonomous vehicle).

Accordingly, the steering wheel adjustment information output unit 130 converts the steering wheel adjustment information into the appropriate signal form to the designated output target apparatus (for example: the steering wheel driving unit 140 and the information output unit 150) in response to the output target apparatus (for example: the steering wheel driving unit 140 and the steering wheel driving unit 150) included (mounted) in the target vehicle.

Figure 2:
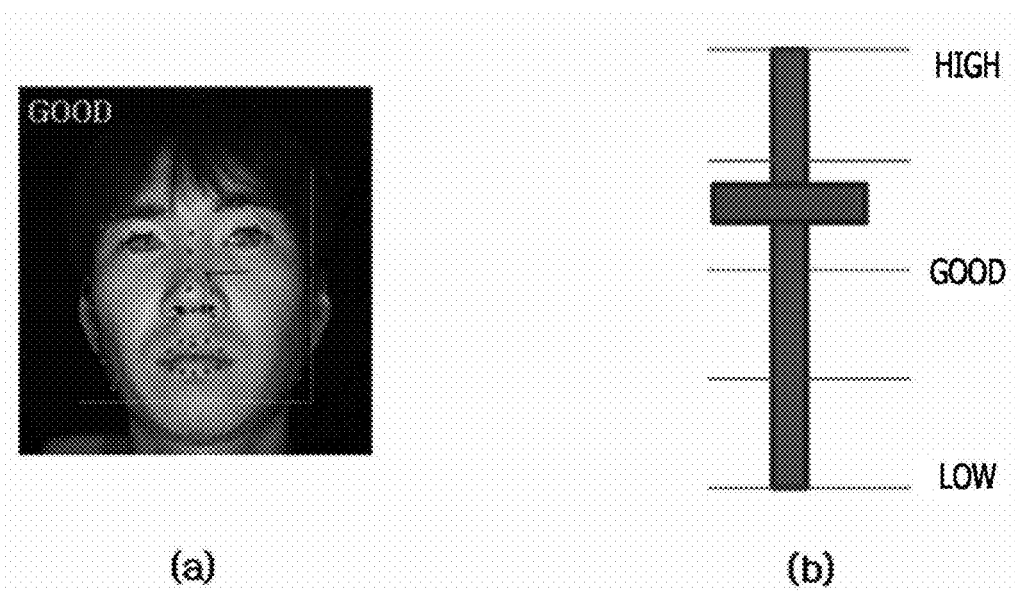
FIG. 2 is an exemplary diagram illustrating a state in which a steering wheel adjustment information output unit outputs steering wheel adjustment information through an information output unit in FIG. 1.

FIG. 2 is an exemplary diagram illustrating a state in which the steering wheel adjustment information output unit outputs the steering wheel adjustment information through the information output unit in FIG. 1. As shown in FIG. 2A, information (for example: GOOD, HIGH, and LOW) may be displayed in connection with the face shape photographed by the camera and the height to be adjusted (up-down direction), or as shown in FIG. 2B, whether a level of the steering wheel is HIGH, LOW, or appropriate (GOOD) may be converted into a gauge bar shape and then outputted.

However, this is illustrated to help understanding and is not limited thereto.

In this case, the control unit 120 may communicate with an electronic control unit (ECU) (not illustrated) of a vehicle to check whether the output target apparatus (for example: the steering wheel driving unit 140 and the information output unit 150) is mounted.

Figure 3:
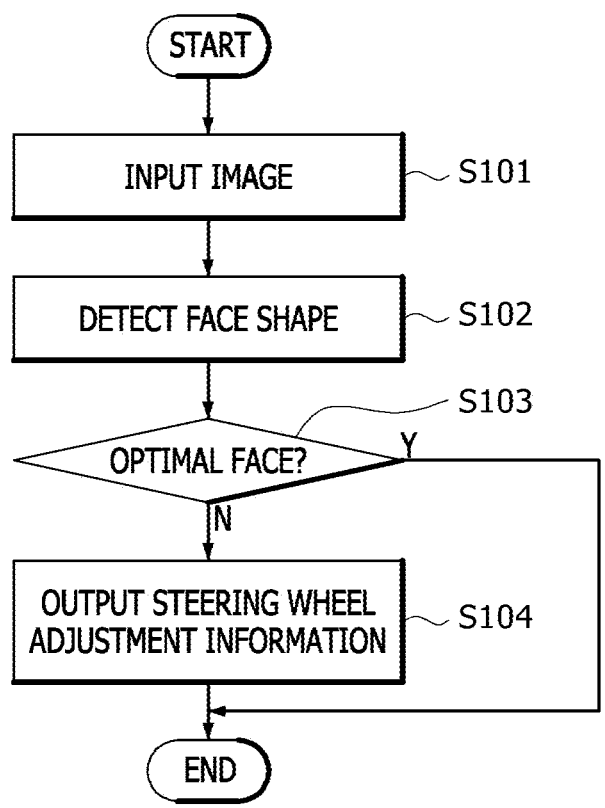
FIG. 3 is a flowchart illustrating a method of adjusting a steering wheel according to an embodiment of the present disclosure.
Figure 4:
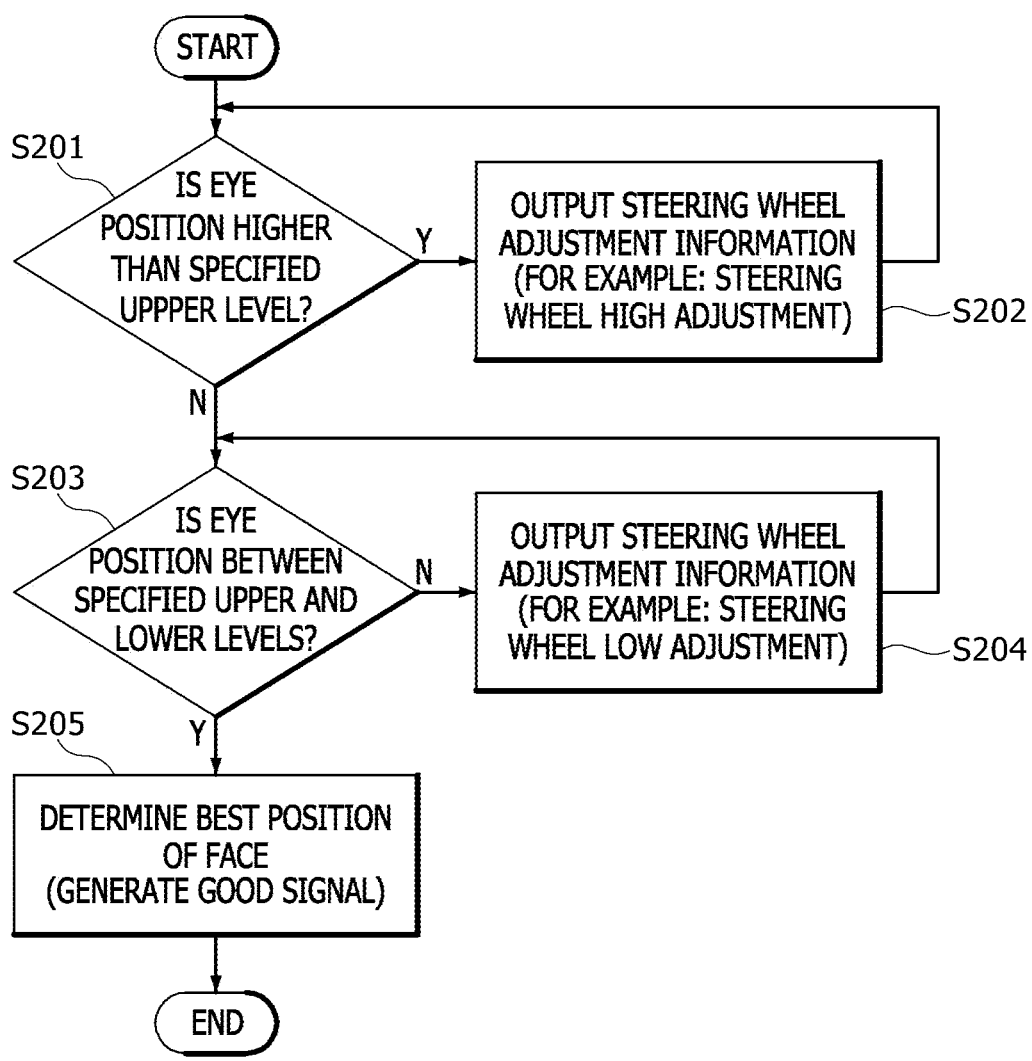
FIG. 4 is a flowchart illustrating more detailed operations for outputting steering wheel adjustment information shown in FIG. 2.
Figure 5:
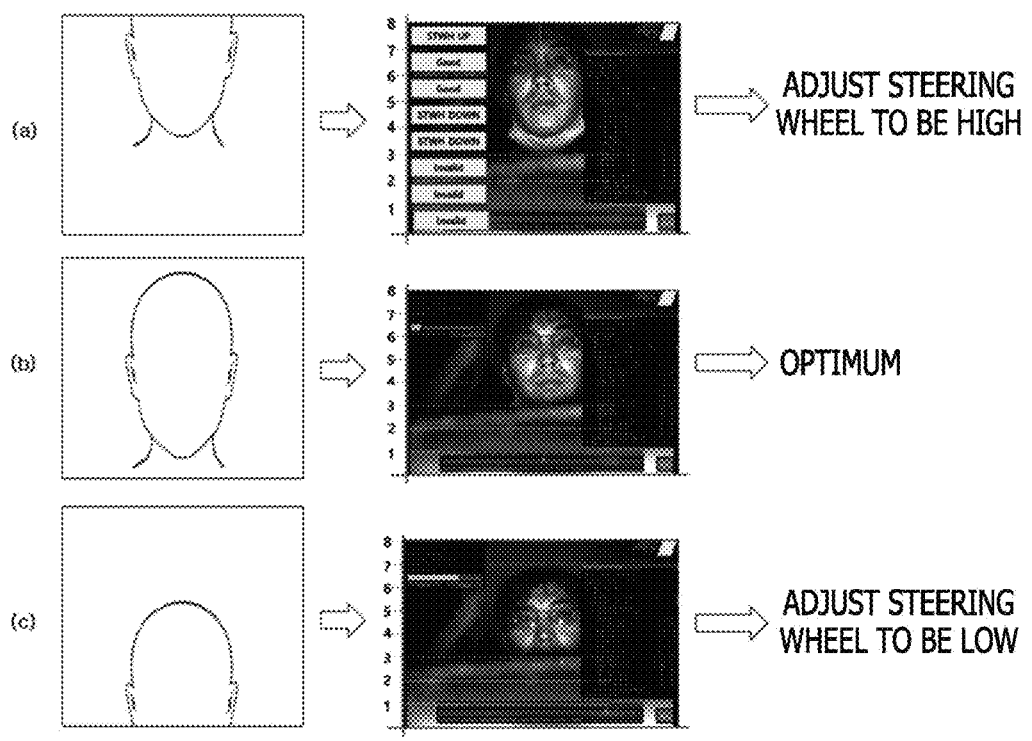
FIG. 5 is an exemplary diagram illustrating a steering wheel adjustment information output according to a face shape in FIG. 4.

FIG. 3 is a flowchart illustrating a method of adjusting a steering wheel according to an embodiment of the present disclosure. FIG. 4 is a flowchart illustrating more detailed operations for outputting the steering wheel adjustment information shown in FIG. 2. FIG. 5 is an exemplary diagram illustrating a steering wheel adjustment information output according to a face shape in FIG. 4.

Referring to FIG. 3, the control unit 120 receives an image captured by the camera unit 110 (S101). In addition, the control unit 120 processes the received image to detect the face shape (that is, eyes, nose, mouth, forehead, chin) (S102).

In addition, the control unit 120 checks whether a detected face shape is the optimal face shape in which upper and lower portions (that is, forehead and chin) of the face are not cut off (that is, eyes, nose, mouth, forehead, and chin forming the face shape are all photographed within the screen without being covered or cut off) (S103).

When the detected face shape is not the optimal face shape in which upper and lower portions (that is, forehead and chin) of the face are not cut off (that is, eyes, nose, mouth, forehead, and chin forming the face shape are all photographed within the screen without being covered or cut off) as the result of the check S103, the designated steering wheel adjustment information is output to the designated output target apparatus (for example: the steering wheel driving unit 140 and the information output unit 150) (S104).

A more detailed method for an operation S104 of outputting the steering wheel adjustment information to the designated output target apparatus (for example: the steering wheel driving unit 140 and the information output unit 150) will be described with reference to FIGS. 4 and 5.

Referring to FIG. 4, as the result of checking whether the user's face is photographed in the optimal face shape, when the forehead portion of the face is cut off or covered not to be photographed (that is, when an eye position is higher than a designated upper level (for example: level 8)) (Yes of S201), the control unit 120 outputs the steering wheel adjustment information for lifting the steering wheel (S202) (see FIG. 5A).

The processes S201 and S202 are repeatedly performed until the forehead portion of the face for being cut off or covered is not photographed (that is, until the eye position is lower than or equal to the designated upper level (for example: level 8)) (No of S201).

When the forehead portion of the face is cut off or covered and is not photographed through the processes S201 and S202 (that is, when the eye position is lower than or equal to the designated high level (for example: level 8), (No of S201), as the result of checking whether the user's face is photographed in the optimal face shape, when the chin portion of the face for being cut off or covered is not photographed (that is, when the eye position is not between the upper and lower level) (No of S203), the control unit 120 outputs steering wheel adjustment information for lowering the steering wheel (S204) (see FIG. 5C).

The processes S203 and S204 are repeatedly performed until the chin portion of the face for being cut off or covered is not photographed (that is, until the eye position is between the designated upper (for example: level 8) and the lower level (for example: level 4) (No of S201).

When the chin portion of the face for being cut off or covered is not photographed through the processes S203 and S204 (that is, when the eye position is between the designated upper (for example: level 8) and the lower level (for example: level 4)) (Yes of S203), the control unit 120 outputs a signal (for example: Good signal) (that is, face optimum position determination signal) indicating that the height of the steering wheel is in an appropriate (or optimal) state (S205) (see FIG. 5B).

Accordingly, when the steering wheel driving unit 140 is included (mounted) in the target vehicle, the steering wheel adjustment information output unit 130 directly outputs the steering wheel adjustment information to the steering wheel driving unit 140 so as to automatically adjust the height of the steering wheel.

In addition, when only the information output unit 150 is included (mounted) in the target vehicle, the steering wheel adjustment information output unit 130 outputs the steering wheel adjustment information to the information output unit 150 as illustrated in FIG. 2, and thus the user (driver) may adjust the height of the steering wheel in a manual manner.

As described above, when the driver's face is monitored through a camera (including In-Cabin Camera) installed inside the vehicle, the steering wheel can be adjusted according to an exemplary of the embodiment so that an entire face optimally photographs without cutting the forehead or chin portion of the driver's face. Thus, there is an effect of allowing the driver monitoring system to operate stably.

Although exemplary embodiments of the disclosure have been described for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims. Furthermore, the implementation described above in the present specification may be performed by, for example, a method or a process, an apparatus, a software program, a data stream, or a signal. Although being discussed only in the context of single-form implementation (for example, being discussed only as a method), the discussed features may be implemented even as another form (for example, apparatus or program). The apparatus may be implemented as proper hardware, software, and firmware. The method may be implemented as, for example, an apparatus, such as a processor generally indicating a processing apparatus including a computer, a microprocessor, an integrated circuit, or a programmable logic apparatus. The processor also includes a communication apparatus, such as a computer, a cellular phone, a portable/personal digital assistant (PDA), and other devices which facilitate information communication between end users.

What is claimed is:

1. An apparatus for adjusting a steering wheel of a vehicle, the vehicle including a steering column having a cover and coupled to the steering wheel, the apparatus comprising:
   a camera unit disposed at a center of an upper end portion of the cover of the steering column and configured to capture an image of a driver's face; and
   a control unit configured to:
      detect the driver's face in the captured image;
      determine whether predetermined portions of the detected driver's face in the captured image are in an optimal face shape; and
      in response to determining that the predetermined portion of the detected driver's face in the captured image are not in the optimal face shape, generate adjustment information related to adjustment of the steering wheel.

2. The apparatus of claim 1, wherein, for determining whether the predetermined portions of the detected driver's face in the captured image are in the optimal face shape, the control unit is configured to check whether the driver's eyes, nose, mouth, forehead and chin in their entirety are included in the captured image.

3. The apparatus of claim 1, wherein:
   the control unit is further configured to:
   convert the adjustment information into an adjustment signal; and
   output the adjustment signal to a designated output target apparatus, and
   the output target apparatus comprises at least one of (1) a steering wheel driving unit configured to adjust a height of the steering wheel of the vehicle based on the adjustment signal, and (2) an information output unit configured to output a sound or image representing the adjustment signal.

4. The apparatus of claim 1, wherein, in response to determining that the driver's forehead is at least partially cut off or covered in the detected driver's face in the captured image, the control unit is configured to generate the adjustment information instructing to lift the steering wheel.

5. The apparatus of claim 1, wherein, in response to determining that the driver's chin is at least partially cut off or covered in the detected driver's face in the captured image, the control unit is configured to generate the adjustment information instructing to lower the steering wheel.

6. A method of adjusting a steering wheel of a vehicle, the vehicle including a steering column having a cover and coupled to the steering wheel, the method comprising:
   receiving, from a camera disposed at a center of an upper end portion of the cover of the steering column, an image capturing a driver's face;
   detecting the driver's face in the received image;
   determining whether predetermined portions of the detected drive's face in the received image are in an optimal face shape; and
   in response to determining that the detected driver's face in the captured image are not in the optimal face shape, generating adjustment information related to adjustment of the steering wheel.

7. The method claim 6, wherein determining whether the predetermined portions of the detected drive's face in the received image are in the optimal face shape comprises determining whether the driver's eyes, nose, mouth, forehead and chin in their entirety are included in the received image.

8. The method of claim 6, further comprising at least one of:
   adjusting, using an electric motor, a height of the steering wheel based on the adjustment information; and
   outputting, via an information output unit, a sound or image representing the adjustment information.

9. The method of claim 6, wherein generating the adjustment information comprises, in response to determining that the driver's forehead is at least partially cut off or covered, in the detected driver's face in the received image, generating the adjustment information instructing to lift the steering wheel.

10. The method of claim 6, wherein generating the adjustment information comprises, in response to determining that the driver's chin is at least partially cut off or covered in the detected driver's face in the received image, generating the adjustment information instructing to lower the steering wheel.

* * * * *